US 6,692,564 B2

(12) United States Patent
Hofmann

(10) Patent No.: US 6,692,564 B2
(45) Date of Patent: Feb. 17, 2004

(54) PREPARATION OF CONCRETE ACCELERATOR

(75) Inventor: Thomas Hofmann, Niederweningen (CH)

(73) Assignee: MBT (Schweiz) AG, Zurich ( * ) Notice: Subject to any disclaimer, the term of this patent is extended or adjusted under 35 U.S.C. 154(b) by 0 days.

(21) Appl. No.: 10/164,348

(22) Filed: Jun. 6, 2002

(65) Prior Publication Data

US 2002/0195026 A1 Dec. 26, 2002

Related U.S. Application Data

(63) Continuation of application No. PCT/EP00/12216, filed on Dec. 1, 2000.

(30) Foreign Application Priority Data

Dec. 8, 1999 (GB) .............................. 9928977

(51) Int. Cl.$^7$ .............................. C04B 24/12
(52) U.S. Cl. ................ 106/696; 106/724; 106/727; 106/728; 106/819; 106/823
(58) Field of Search ................ 106/696, 724, 106/727, 728, 819, 823

(56) References Cited

U.S. PATENT DOCUMENTS

| | | | |
|---|---|---|---|
| 3,940,358 A | * | 2/1976 | Bernett et al. |
| 4,499,142 A | * | 2/1985 | Kingston ............. 428/331 |
| 4,507,154 A | | 3/1985 | Bürge et al. |
| 5,660,625 A | * | 8/1997 | Helmboldt et al. ...... 106/736 |
| 5,935,318 A | * | 8/1999 | Angelskar et al. ...... 106/727 |
| 5,997,630 A | * | 12/1999 | Angelskar et al. ...... 106/696 |
| 6,302,954 B1 | * | 10/2001 | Lunkenheimer et al. ... 106/727 |

FOREIGN PATENT DOCUMENTS

| | | | |
|---|---|---|---|
| CZ | 266129 | * | 11/1989 |
| DE | 19754826 | * | 6/1998 |
| EP | 0110847 A1 | | 6/1984 |
| EP | 742179 | * | 11/1996 |
| JP | 62260784 | * | 11/1987 |

OTHER PUBLICATIONS

Concrete Admixtures and the environment, Betonwork + Fertigeteil tecknik (1996), 62 912), 54–56, 58–62, 64, 66–69.*

* cited by examiner

Primary Examiner—Paul Marcantoni
(74) Attorney, Agent, or Firm—Norris McLaughlin & Marcus

(57) ABSTRACT

An alkali-free accelerator for sprayed concrete is prepared by dissolving aluminium sulphate and amorphous aluminium hydroxide in water which optionally contains one amine, and optionally adding at least one stabiliser, selected from hydroxycarboxylic acid and phosphoric acids and non-alkaline salts thereof, and at least one defoaming agent.

13 Claims, No Drawings

PREPARATION OF CONCRETE ACCELERATOR

This is a continuation of application No. PCT/EP00/12216 filed Dec. 1, 2000.

This invention relates to cementitious compositions and to accelerators for use herein, particularly for sprayed concrete.

The application of concrete to a substrate by spraying from a nozzle (commonly referred to as "shotcreting") is a well-established technology, and is widely used in such applications as the lining of tunnels. It is important that the sprayed concrete set very rapidly on the substrate, and this is achieved by the addition to the concrete at the nozzle of an accelerator. These accelerators are quite different from those used with conventional concrete and have traditionally included such materials as alkali metal hydroxides, aluminates and silicates.

The highly alkaline nature of these materials has given handing problems. It also means that their use in confined spaces such as tunnels has led to very unpleasant working atmospheres. Recent attempts to avoid such materials have involved the use of aluminium compounds and typical examples may be found in European Patents 0 076 927, 0 775 097 and 0 742 179, Australian Patent 706917 and European Applications 0 812 812 and 0 946 451.

It has now been found that it is possible to prepare an accelerator for sprayed concrete by a simple process, which accelerator performs especially well. The invention therefore provides a method of preparing an accelerator for sprayed concrete consisting essentially of the steps of (i) dissolving aluminium sulphate and aluminium hydroxide in water which optionally contains at least one amine dissolved therein, to give a clear solution; and (ii) optionally adding at least one of at least one stabiliser and at least one defoaming agent;

the proportions of ingredients present being such that the final product contains from 3%–12% by weight of aluminium sulphate (measured as $Al_2O_3$), up to 30% by weight of amorphous aluminium hydroxide, up to 15% by weight amine, up to 3% by weight defoaming agent and up to 0.06 mol/kg. stabiliser, the stabiliser being selected from hydroxycarboxylic acids, phosphoric acids and non-alkaline salts of phosphoric acids.

The invention additionally provides an accelerator for use with sprayed concrete prepared by such a method.

The aluminium sulphate used may be any commercially-available material. Aluminium sulphates differ in their purity and constitution, the most common being so-called "17%" because it contains 17% of $Al_2O_3$. In practical terms, the weight percentage of 17% aluminium sulphate, $Al_2(SO_4)_3 \cdot 14.3 H_2O$, which should be used in the process according to the invention lies in the range of from 30% to 60%, preferably from 40%–48%.

The aluminium hydroxide may be any commercially-available amorphous aluminium hydroxide. Although all such aluminium hydroxides will give satisfactory results, it is generally true that the more recent the date of manufacture, the better the result. In addition, aluminium hydroxides which, as a result of their particular manner of manufacture, contain a small proportion of aluminium carbonate (up to 5%) are easier to dissolve and are preferred materials. This behaviour is not obtained by simply adding aluminium carbonate to pure aluminium hydroxide. Although very small quantities of aluminium hydroxide may be used (less than 0.1% is possible), a significant improvement is observed at 5% or more. The preferred range of weight proportions is from 8–25%, preferably from 15–25%.

Although aluminium sulphate, aluminium hydroxide and water can, when utilised together in the process of the invention, give accelerators with good properties, the properties can be considerably enhanced by the use of one or more of three optional, but preferred, components.

The first of these is amine. This must be water-soluble, otherwise there is no restriction on the choice of amine. Preferred amines are alkanolamines, such as diglycolamine, diethanolamine and triethanolamine, diethanolamine being particularly preferred. Up to 10% by weight amine may be used, preferably from 4–7%.

The second preferred additional component is stabiliser, which may be added at the end of the process. This is a material which prevents the aluminium hydroxide/aluminium sulphate solution either from precipitating or from forming a gel. Without stabiliser, the solution will function well as an accelerator, but it will often lack stability and therefore shelf life, necessitating its use very shortly after manufacture, something usually not practical. It is possible and permissible to use more than one stabiliser.

The stabilisers for use in this invention are hydroxycarboxylic acids, phosphoric acids and non-alkaline salts of phosphoric acids. The hydroxycarboxylic acid may be selected from any such acid known to the art. The preferred acid is citric acid, but many other acids, such as lactic acid and ascorbic acid may also be used.

By "phosphoric acid" is meant one of the acids orthophosphoric acid ($H_3PO_4$), metaphosphoric acid ($(HPO_3)_x$) and pyrophosphoric acid ($H_4P_2O_7$). By "non-alkaline salts" is meant salts which do not include the alkali metals sodium and potassium. Thus, for example, lithium, calcium and magnesium phosphate salts may be used.

The third preferred additional component, defoaming agent, may be any such material known to the art. Most of these are proprietary commercial materials whose precise composition is never revealed, but any such material known to the art is suitable. Typical examples include silicone types such as AGITAN (trade mark) and fatty acid polyether types such as LUMITEN (trade mark) EL.

The defoaming agent may be used at a rate out up to 5% (solids by weight of the whole composition), preferably from 0.5%–3%. The use of defoaming agent makes the use of less fresh aluminium hydroxides easier. It is believed, without restricting the scope of the invention in any way, that its presence helps in the removal of carbon dioxide which accumulates on the surface of the aluminium hydroxide over time. Surprisingly, provided that the defoamer contains no silicone and that it is not present to the extent of more than 3%, it gives an appreciable improvement in setting time over that of an identical composition without defoaming agent or with silicone types.

The process of the invention is readily carried out with standard equipment, and the skilled person will have no difficulty in doing so. It will be appreciated that in order to achieve solutions at the various stages, some heating may be necessary, typically to about 50–60° C.

In the process, the clear solution can be produced by any convenient method. It is possible to add the aluminium sulphate and aluminium hydroxide sequentially in any order to water. It is also possible to add them together to water, or to dissolve or disperse them individually in two different quantities of water and then combine these quantities.

Preferably, the aluminium sulphate and the aluminium hydroxide are added sequentially to water. Preferably the aluminium sulphate is first dissolved in water; aluminium sulphate will dissolve with heating. To this solution the aluminium hydroxide is then added. A clear solution is obtained.

It is possible, although less preferable, first to add the aluminium hydroxide to the water. Aluminium hydroxide does not dissolve readily in water, but gives a fine suspension. To this suspension the aluminium sulphate is added. A clear solution is obtained.

The precise nature of the product of the process is not known. It is certainly not a mere mixture of the original components (the fact that the product is a clear or slightly turbid solution and not an opaque suspension typical of aluminium hydroxide is evidence of this), and without restricting the invention in any way, it is believed to be oligomeric or polymeric in nature.

The accelerator thus prepared gives excellent results when used as a shotcrete accelerator. Shotcrete treated therewith hardens rapidly and has good final strength. The accelerator has a long shelf-life, is resistant to changes in temperature and is completely non-alkaline, thus leading to better working environments.

The invention is further illustrated by the following non-limiting examples.

EXAMPLES 1–3
Preparation of Accelerators According to the Invention.
The weight proportions used are as follows:

|  | Example 1 | Example 2 | Example 3 |
|---|---|---|---|
| 17% aluminium sulphate | 46% | 48% | 40% |
| amorphous aluminium hydroxide | 18% | 18% | 18% |
| water | 30% | 28% | 28% |
| diethanolamine (90% solution) | 6% | 6% | 4% |

The diethanolamine is dissolved in the water and the aluminium sulphate is then dissolved in this solution. This is achieved by heating the solution to 50°–60° C. and adding with stirring, stirring being continued until a clear solution is obtained. To this heated, stirred solution is gradually added the aluminium hydroxide, and stirring is continued until a clear solution is obtained.

EXAMPLE 4

An accelerator is prepared by the method and using the materials of Examples 1–3, except that the water content is lowered to 28.7% and there is added 1.3% citric acid monohydrate. This is added after the addition of the aluminium hydroxide, the solution being cooled to room temperature prior to addition. The result is a clear solution.

EXAMPLE 5
Testing of Accelerators in Mortar.
The mortar used for the testing has the following formulation:

| | |
|---|---|
| Normo 4 Portland cement | 450 parts |
| SIA 215-1 standard sand | 1350 parts |
| phosphonic acid-based cement hydration stabiliser[1] | 0.3% by weight of cement |
| polycarboxylate superplasticiser[2] | 0.6% by weight of cement |

[1]DELVO (registered trade mark) stabiliser ex MBT
[2]GLENIUM (registered trade mark) 51 ex MBT Sufficient water is added to give a water/cement (w/c) ratio of 0.47.

To samples of the mortar, each of the accelerators of Examples 1, 2 and 4 is added at a rate of 7% by weight of cement, and the initial and final setting times are measured by the Vicat test procedure of EN 196-3. In addition, a commercially-available alkali-free accelerator MEYCO (trade mark) SA 160 was also tested. The results are as follows.

|  | Example 1 | Example 2 | Example 4 | Commercial accelerator |
|---|---|---|---|---|
| Initial (min) | 4 | 1 | 3.5 | 3 |
| Final (min) | 8 | 5.5 | 8.5 | 6 |

What is claimed is:

1. A method of preparing an accelerator for sprayed concrete, consisting essentially of the steps of:
   (i) dissolving aluminum sulphate and aluminum hydroxide in water, containing at least one amine dissolved therein, to give a clear solution; and
   (ii) optionally adding at least one of at least stabilizer and at least one defoaming agent; wherein the proportions of ingredients present being such that the final product contains from 3%–12% by weight of aluminum sulphate (measured as $Al_2O_3$), up to 30% by weight of amorphous aluminum hydroxide, 4–7% by weight amine, up to 3% by weight defoaming agent and up to 0.06 mol/kg, stabilizer, being selected from the group consisting of hydroxycarboxylic acids, phosphoric acids and non-alkaline salts of phosphoric acids.

2. A method according to claim 1, wherein there is added at least one of an at least one stabilizer and at least one defoaming agent.

3. A method according to claim 2, wherein there is added at least one stabilizer.

4. A method according to claim 2, wherein there is added at least one defoaming agent.

5. A method according to claim 4, wherein the defoaming agent contains no silicone and is present to a maximum extent of 3%.

6. A method according to claim 1, wherein the stabilizer is at least one hydroxycarboxylic acid.

7. A method according to claim 1, wherein a clear solution is prepared by the steps of
   (i) dissolving aluminum sulphate in water, containing at least one amine dissolved therein; and
   (ii) dissolving amorphous aluminum hydroxide in the solution of (i) until a clear solution is obtained.

8. A method according to claim 7, wherein there is added to the clear solution at least one of
   (a) at least one defoaming agent, and
   (b) at least one stabilizer selected from the group consisting of hydroxycarboxylic acids, phosphoric acids and non-alkaline salts of phosphoric acids, and hydroxycarboxylic acids.

9. An accelerator for use with sprayed concrete, prepared by a process according to claim 1.

10. The method of claim 1, wherein the at least one amine is an alkanolamine.

11. The method of claim 10, wherein the alkanolamine is selected from the group consisting of diglycolamine, diethanolamine and triethanolamine.

12. The method of claim 11, wherein the alkanolamine is diethanolamine.

13. An accelerator for use with sprayed concrete, prepared by a process according to claim 12.

* * * * *